United States Patent [19]
Buchan et al.

[11] Patent Number: 5,201,339
[45] Date of Patent: Apr. 13, 1993

[54] TREATMENT OF LIQUIDS

[75] Inventors: Leon Buchan, Johannesburg, South Africa; Joseph T. Webb, Newborn, Ga.

[73] Assignee: Control Chemicals (Proprietary) Limited, South Africa

[21] Appl. No.: 802,748

[22] Filed: Dec. 6, 1991

[30] Foreign Application Priority Data

Dec. 6, 1990 [ZA] South Africa ............... 90/9811
May 2, 1991 [ZA] South Africa ............... 91/3315
May 22, 1991 [ZA] South Africa ............... 91/3874

[51] Int. Cl.[5] ............................................. B01F 1/00
[52] U.S. Cl. ................................. 137/268; 422/263; 422/277
[58] Field of Search ............... 137/268; 422/282, 263, 422/277, 268

[56] References Cited

U.S. PATENT DOCUMENTS

| | | |
|---|---|---|
| 1,216,051 | 2/1917 | Bayley . |
| 2,760,820 | 8/1956 | Cirese . |
| 2,971,825 | 2/1961 | Kersh . |
| 3,495,948 | 2/1970 | Long . |
| 3,727,760 | 4/1973 | Soriano . |
| 3,846,078 | 11/1974 | Brett . |
| 3,990,855 | 11/1976 | Cort et al. . |
| 4,252,773 | 2/1981 | Spiegel . |
| 4,260,587 | 4/1981 | Braden . |
| 4,270,565 | 6/1981 | King, Sr. . |
| 4,331,174 | 3/1982 | King . |
| 4,407,322 | 10/1983 | Moore ................... 137/268 |
| 4,584,106 | 4/1986 | Held . |
| 4,662,387 | 5/1987 | King ..................... 137/268 |
| 4,842,729 | 6/1989 | Buchan . |

FOREIGN PATENT DOCUMENTS

| | | |
|---|---|---|
| 0012199 | 10/1979 | European Pat. Off. . |
| 0214854 | 8/1988 | European Pat. Off. . |
| 2430253 | 2/1980 | France . |
| 25568 | of 1911 | United Kingdom . |
| 1272666 | 7/1969 | United Kingdom . |

Primary Examiner—Alan Cohan
Attorney, Agent, or Firm—Jones & Askew

[57] ABSTRACT

A liquid treatment installation comprises apparatus for controllably treating a liquid with a liquid treatment substance. The apparatus comprises a body, a container for a liquid treatment substance in the body, and a removable closure member on the body. The installation also includes a liquid supply conduit connected to the liquid inlet of the apparatus, a liquid discharge conduit connected to the liquid outlet of the apparatus, and level control means for maintaining the liquid level in the container, thereby to dose liquid passing through the body accurately with liquid treatment substance.

13 Claims, 5 Drawing Sheets

TREATMENT OF LIQUIDS

This invention relates to the treatment of liquids. It relates in particular to a liquid treatment installation, and to liquid treatment apparatus.

According to a first aspect of the invention, there is provided a liquid treatment installation, which comprises apparatus for controllably treating a liquid with a liquid treatment substance, the apparatus comprising a body having a first portion providing an elongate container receiving zone and an opening leading into the zone, as well as a second portion providing a liquid flow path, with the container receiving zone being in communication with the liquid flow path, the second portion having a liquid inlet as well as a liquid outlet, and with the liquid inlet and the liquid outlet being spaced apart on opposite sides of the container receiving zone;

a container for a liquid treatment substance, the container comprising a cylindrical sleeve, end pieces closing off each end of the cylindrical sleeve, and at least one aperture in the sleeve in proximity to a first end thereof, with the container located in the container receiving zone of the body so that its first end protrudes sufficiently into the liquid flow path for the aperture in the sleeve to be exposed to liquid flowing along the liquid flow so that, in use, liquid enters the container through the aperture and a liquid level is established in the container; and a removable closure member closing off the opening in the first body portion and against which the other or second end of the container abuts;

a liquid supply conduit connected to the liquid inlet of the apparatus;

a liquid discharge conduit connected to the liquid outlet of the apparatus; and level control means for maintaining the liquid level in the container, thereby to dose the liquid passing along the flow path accurately with liquid treatment substance.

The liquid outlet in the second body portion may be of reduced cross-sectional area as compared to the second body portion, with the inlet and outlet being arranged such that the liquid flow path through the second body portion is non-linear, and with the arrangement of the liquid inlet and outlet constituting at least part of the level control means.

Instead, the inlet and outlet may be aligned with each other. The level control means may then include a conduit within the second body portion, the conduit having an inlet opening directed away from the container receiving zone and its outlet opening constituting the liquid outlet, and with the conduit being of reduced cross-sectional area as compared to the second body portion. The conduit is thus non-linear, and may be in the form of an elbow.

The installation may include valve means in the supply and discharge conduits; and pressure regulating means in the supply conduit. The apparatus may include seal means around the container with the seal means forming a fluidtight yet movable seal between the container and the first body portion so that on insertion of the container in the first body portion and urging thereof to the position in which the first end protrudes into the liquid flow path, air in the first body portion and container will thereby be compressed when the valve means are closed. The pressure regulating means or pressure regulator may be a ratio reducing valve, such as that available in South Africa under the trade name MAXIFLO. The valve means may be isolating valves. The valve in the supply conduit may be located between the pressure regulating means and the apparatus. Instead, it may be located upstream of the pressure regulating means, if desired. A drain may also be provided in the discharge conduit between the valve and the apparatus, as well as in the supply conduit between the valve and the apparatus. If desired, an openable drain may also be provided on the second body portion of the apparatus.

The invention extends also to a method of operating such an installation, which comprises closing the valves in the supply and delivery conduits;

opening the drain(s);

removing the container or cartridge from the apparatus;

closing the drain(s);

replacing a or the cartridge in the apparatus;

replacing the closure member so that the first or lower end of the container is urged to protrude into the liquid flow path, thereby causing the air in the apparatus and the conduits to be pressurized; and opening the valves to permit fluid flow through the flow passage as well as through the first end of the cartridge, with the compressed air in the cartridge serving to control the height to which the liquid level rises in the cartridge, thereby enhancing accurate dosage rates.

The applicant believes that in this fashion very low dosage levels of the liquid with treatment substance contained in the cartridge can be effected for long periods of time, with dosage levels in the range of 1-10 ppm being achievable consistently.

The applicant further believes that by reducing, by means of the pressure regulating means, the liquid supply pressure from a high pressure, typically 0.8-10 bar, down to 0.1-0.5 bar, consistent dosages at low levels can be further enhanced. However, due to the use of the conduit in the apparatus, accurate dosage levels will also, the applicant believes, be obtainable at higher pressures, since pressurized air in the apparatus cannot readily escape as a result of the conduit so that the dampening and control effect of the air is maintainable even at higher pressures.

Still further, because of the use of the pressure regulating means, surges in supply liquid pressure can be avoided or at least reduced. Without the use of the pressure regulating means, flooding of the cartridge, so that a cushion of pressurized air is destroyed, could result.

Normally, the liquid will be water. Typically, the discharge conduit can then be connected to a water cistern, for low pressure application such as poultry houses. Instead, the apparatus can be placed at a high level to supply water at low pressure into overhead reservoirs or the like. Still further, the discharge conduit can be connected to a pressure vessel, in which the water can be repressurized to supply pressurized systems.

The level control means may, however, also include pressurizing means for pressurizing the container with a gaseous pressurizing medium, thereby to control or maintain the liquid level in the container.

The pressurizing means may comprise a connector in the end piece at the second end of the sleeve, with the connector extending through an aperture in the closure member and being adapted so that a pressurizing medium conduit can be connected thereto; and a one-way valve in the connector. Instead, said end piece may merely be provided with an aperture, with the connecter then being mounted to the closure member cover portion and being aligned with this aperture.

A pressurizing device such as a pump, compressor, pressure vessel or the like, operatively connected to the connector, may be provided. The pressurizing medium conveniently can be air.

When the pressurizing device is a compressor or pressure vessel, a pressure regulating device for regulating the air pressure at about the same pressure as the liquid pressure downstream of the pressure regulating means, may be provided, to ensure a constant liquid level in the container.

The invention thus extends also to a method of operating such an installation, i.e. an installation including pressurizing means as hereinbefore described, which comprises allowing liquid to pass through the apparatus, with the container protruding into the liquid flow path, so that the liquid also fills the container at least partially; and introducing sufficient pressurizing medium into the container by means of the pressurizing means such that the liquid level is maintained or controlled at a predetermined position in the container, thereby maintaining or controlling accurate dosing of liquid treatment substance contained in the container into the liquid.

The method may include periodically re-adjusting the liquid level to its original position by means of the pressure regulating device as the liquid treatment substance is consumed.

To operate such an installation, eg to replace a spent container, the steps outlined hereinbefore can be followed. However, the method will then include pressurizing the container, by means of the pressurizing means, sufficiently to control the liquid level in the cartridge, at a desired height or position, as hereinbefore described thereby enhancing accurate dosing.

With this installation, ie which includes the pressurizing means, the advantages set out hereinbefore also apply; however, the liquid supply pressure can be somewhat higher, if desired, eg in the order of 2 to 3 bar, eg about 2,7 bar, while still obtaining accurate low dosage levels.

The level control means may instead, or additionally, include control means in the supply conduit for controlling the supply of fluid along the conduit, with little or no back pressure being exerted by means of the discharge conduit, eg with the discharge conduit being open to atmosphere so that, on interruption of liquid flow along through the apparatus by means of the control means, air can enter the apparatus, and hence the container, through the discharge conduit, thereby to restore the air pressure within the container and thus ensure that the liquid rises to the same level in the container each time liquid flow is recommenced.

The installation may include a receiving vessel into which the supply conduit discharges, and liquid level measuring means in the vessel, the level measuring means being operatively connected to the control means such that, on the liquid level in the vessel dropping below a predetermined setting, the control means is actuated by means of the level measurement means, to allow liquid flow through the apparatus into the vessel, and on the liquid level in the vessel rising to the or another predetermined setting, the control means is de-actuated to interrupt or stop the liquid flow through the apparatus.

Thus, the free end of the discharge conduit may terminate above the liquid level in the receiving vessel. However, it may instead be located below the liquid level, in which case a relatively small aperture can be provided in the conduit so that air can enter the conduit through this opening, but with the aperture being sufficiently small such that a slight back pressure is exerted on the apparatus by the liquid present in the discharge conduit at its free end.

The liquid level in the vessel will thus, in use, drop in response to consumption of dosed or treated liquid at a downstream point or zone connected to the vessel outlet. This will in turn actuate the control means to allow liquid again to enter the vessel, via the dosing apparatus. When the liquid has risen to the desired or predetermined level, the control means will thus be de-actuated. The applicant believes that the actuation/de-actuation results in some liquid turbulence being created in the apparatus resulting in loss or escape of air from the container, and leading to a rise in the liquid level in the container. Consumption of treatment substance in the container also leads to a liquid level rise in the container. Such liquid level rise is undesirable since, for constant liquid dosing at low levels, the liquid level in the container should be such that only the bottommost liquid treatment tablet in the container is wetted. This should be achieved even under variable treated liquid demand conditions, ie continual on/off or intermittent liquid flow conditions, which is possible with this version of the installation. When liquid flow through the apparatus is interrupted, liquid drains from the apparatus, thus avoiding the bottommost tablet lying in a pool of water. At the same time atmospheric air pressure in the cartridge is restored by air entering the suction conduit, and hence the apparatus, through the conduit aperture or hole.

The control means may comprise a solenoid operated valve, while the level measurement means may comprise a float operated switch mechanism.

The installation may also include a pressure pump, pressurizing vessel or pressurizing device operatively connected to an outlet of the receiving vessel. Thus, a delivery conduit may lead from the vessel outlet to the pressure pump, vessel or device, with a further delivery conduit leading from the pressure pump vessel or device.

The components of the installation may all be housed in a suitable housing. To erect the installation, the suction conduit is then merely connected to a water supply, and the further delivery conduit to a pipeline leading to a consumption point or zone such as a chicken or poultry battery or housing.

The applicant believes that with this version of the installation, the same advantages as set out hereinbefore apply, with the apparatus discharging substantially to atmospheric pressure.

According to a second aspect of the invention, there is provided apparatus for controllably treating a liquid with a liquid treatment apparatus, the apparatus comprising a body having a first portion providing an elongate container receiving zone and an opening leading into the zone, as well as a second portion providing a liquid flow path extending transversely to the container receiving zone, with the container receiving zone being in communication with the liquid flow path, the second portion having a liquid inlet as well as a liquid outlet, and with the liquid inlet and the liquid outlet being spaced apart on opposite sides of the container receiving zone;

a container for a liquid treatment substance, the container comprising a cylindrical sleeve, end pieces closing off each end of the cylindrical sleeve, and at least one aperture in the sleeve in proximity to a first end thereof, with the container located in the container receiving zone of the body so that its first end protrudes sufficiently into the liquid flow path for the aperture in the sleeve to be exposed to liquid flowing along the liquid flow so that, in use, liquid enters the container through the aperture and a liquid level is established in the container; and a removable closure member closing off the opening in the first body portion and against which the other or second end of the container abuts; with the liquid outlet being of reduced cross-sectional area as compared to the second body portion, and with the inlet and outlet being arranged such that the liquid flow path through the second body portion is non-linear.

As mentioned hereinbefore, the inlet and outlet may be aligned with each other, and the apparatus may include a conduit as hereinbefore described within the second body portion, the apparatus may also include seal means around the container with the seal means forming a fluidtight yet movable seal between the container and the first body portion; and the apparatus may further include pressurizing means for pressurizing the container with a gaseous pressurizing medium, thereby to control or maintain the liquid level in the container.

According to a third aspect of the invention, there is provided apparatus for controllably treating a liquid with a liquid treatment apparatus, the apparatus comprising a body having a first portion providing an elongate container receiving zone and an opening leading into the zone, as well as a second portion providing a liquid flow path extending transversely to the container receiving zone, with the container receiving zone being in communication with the liquid flow path, the second portion having a liquid inlet as well as a liquid outlet, and with the liquid inlet and the liquid outlet being spaced apart on opposite sides of the container receiving zone;

a container for a liquid treatment substance, the container comprising a cylindrical sleeve, end pieces closing off each end of the cylindrical sleeve, and at least one aperture in the sleeve in proximity to a first end thereof, with the container located in the container receiving zone of the body so that its first end protrudes sufficiently into the liquid flow path for the aperture in the sleeve to be exposed to liquid flowing along the liquid flow so that, in use, liquid enters the container through the aperture and a liquid level is established in the container;

a removable closure member closing off the opening in the first body portion and against which the other or second end of the container abuts; and pressurizing means for pressurizing the container with a gaseous pressurizing medium, thereby to control the liquid level in the container.

The first and second body portions may be of elongate cylindrical form, and the second body portion may extend orthogonally to the first body portion. Thus, the body may be T-shaped, with the first and second body portions being circular in cross-section. The second body portion may be of constant diameter.

The liquid inlet may also be of reduced cross-sectional area as compared to the cross-sectional area of the second body portion. Thus, an annular flow restricter or reducer may be provided at the inlet end of the second body portion, with the central opening on the reducer providing the liquid inlet.

An annular reducer may also be provided at the outlet end of the second body portion, with the conduit, when present, protruding from the reducer into the second body portion.

If desired, the container may be movable from an inoperative position in which the seal means seals fluid-tightly against the first body portion to prevent liquid passing from the flow path into the aperture(s), to an operative position in which the first end of the sleeve protrudes into the flow path as hereinbefore described.

If further desired, the apparatus may also include bias means inside the body for biassing the first end of the sleeve out of the liquid flow path, with the closure member then comprising a circular cover portion and a peripheral skirt depending from the cover portion. The skirt may be adapted to pass around that portion of the body providing the opening to the container receiving zone or chamber, and an external screw thread formation may be provided on the body around the opening, with a complemental internal screw thread formation being provided on the skirt of the closure member. The length of the container or basket will then be such that it protrudes from the open end of the chamber and abuts against the underside of the cover portion of the closure member so that as the closure member is screwed onto the body portion, the container or basket is urged further into the water flow path against the bias of the bias means.

The sleeve and end pieces may be of plastics material, and the end pieces may be integral with, eg welded to, the sleeve. The end piece at the second end of the sleeve may have a larger diameter than the sleeve so that it protrudes radially outwardly from the sleeve. The sleeve may be provided with a plurality of the apertures in proximity to its first end, ie it may be foraminous or apertured in proximity to its first end. Its apertured portion may constitute less than half the total length of the sleeve, and even less than one-fifth of its total length, about 5-10% of its length.

The seal means may comprise a O-ring of compressible material located in a circumferential groove in the sleeve. The O-ring may comprise an annular body portion as well as a circumferential flange-like portion extending radially outwardly from the body portion.

A liquid treatment substance may thus be provided inside the container or basket, the liquid treatment substance being dispersable or soluble in the liquid in question, which will normally be water. The treatment substance may be in the form of pills located one above the other in the basket, and may contain an active agent capable of rendering water potable.

The active agent may be a halogen-based compound. The substance may be in the form of pills, tablets, granules or the like. In one embodiment, the chlorine-based compound may be a slow chlorine-release compound, such as trichloroisocyanuric acid (TCIA). In another embodiment, the chlorine-based compound may be a rapid chlorine-release compound, such as calcium hypochlorite. The substance may comprise one or more tablets as described in South African Patent No. 77/0938, and which includes calcium hypochlorite and chloride of lime. In yet another embodiment, it may comprise an admixture of calcium hypochlorite and stearic acid hydrazide, preferably in the form of a tablet.

A support may be located inside the container or basket supporting the pills with clearance from the end piece at the first end, ie the first end piece. The support may comprise a protrusion protruding a sufficient distance from the first end piece so that the undersurface of the bottommost tablet resting on it will be located at about the level of, eg slightly above, the bottommost edge of the aperture(s) closest to the first end piece.

Typically, the ratio of the diameter of the container to its length may be between 1:2 and 1:4, eg about 1:3. The apertures may be spaced apart circumferentially, and may be generally square or rectangular, having bottom edges which extend parallel to the first end of the sleeve, ie orthogonally to its axis. The apertures may be arranged in a plurality of axially spaced rows, the apertures in one row being located equidistantly from the first end of the sleeve. The row of apertures located closest to the sleeve's first end, may be positioned so that their bottom edges are spaced 0.5 to 2 cm from the base, eg about 1 cm. The width of the groove accommodating the seal ring may be tween 2 and 5 mm, eg about 3 mm.

Seal means may also be provided between the screw thread formation on the first body portion and the free end of the chamber, with this seal means adapted to seal fluid-tightly against the inner surface of the skirt of the closure member between the internal screw thread formation on the skirt and the cover portion of the closure member. The seal means may comprise a first O-ring of compressible or resilient material, eg rubber, located in a circumferential groove in the body, as well as a second O-ring located around the first O-ring within the grove. The second O-ring may be of less resilient material than the first O-ring, eg of TEFLON (trade name). In one embodiment, the second O-ring may comprise an annular body portion and a circumferential flange-like portion extending radially outwardly from the body portion. In another embodiment, it may comprise an annular body having a peripheral slit so that, on the chamber being pressurized, air will enter the slit thereby causing the ring body to flare open and seal effectively against the closure member.

The invention will now be described by way of example with reference to the accompanying diagrammatic drawings.

Figure 1:
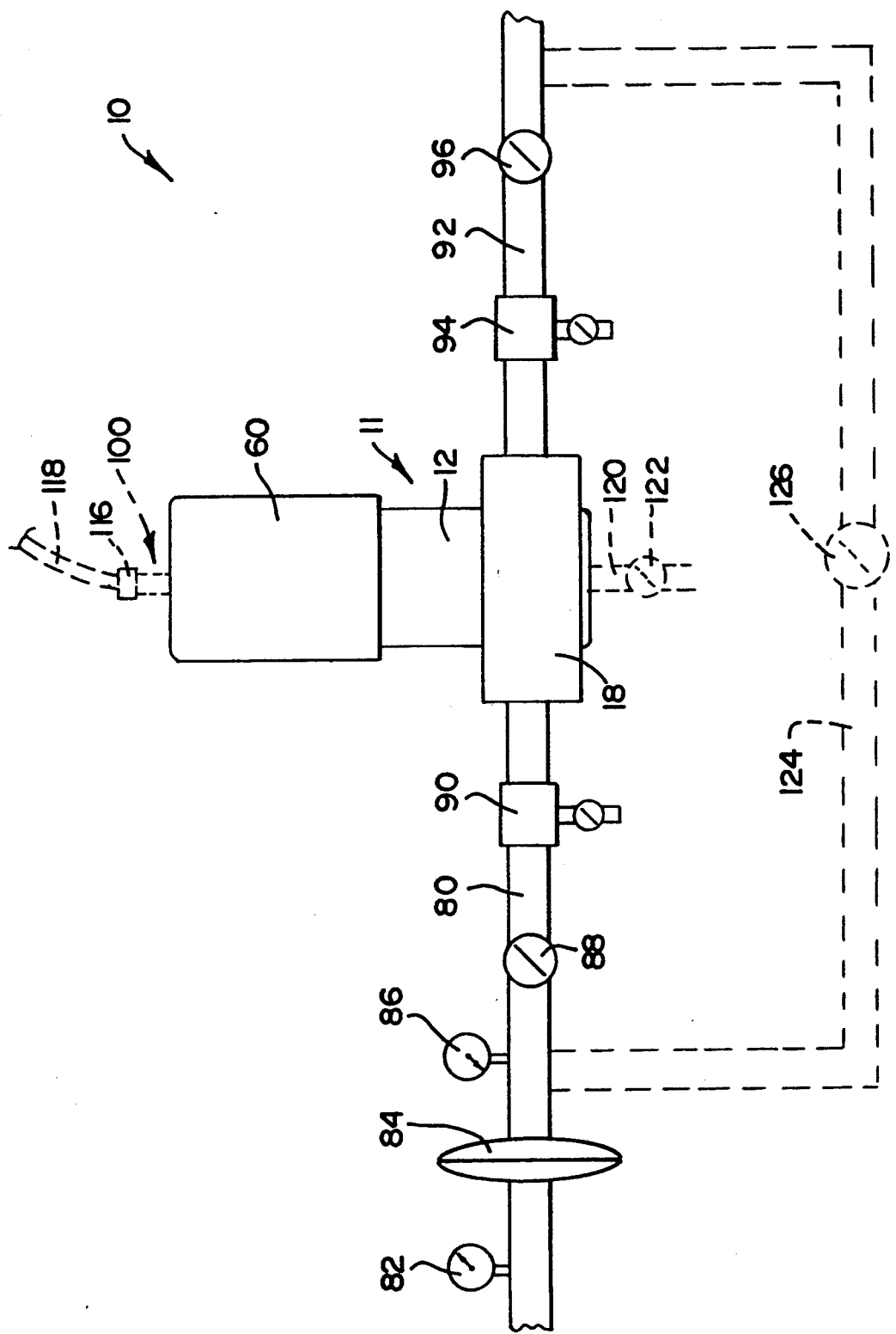
FIG. 1 shows a side view of a water treatment installation according to one embodiment of the invention.
Figure 2:
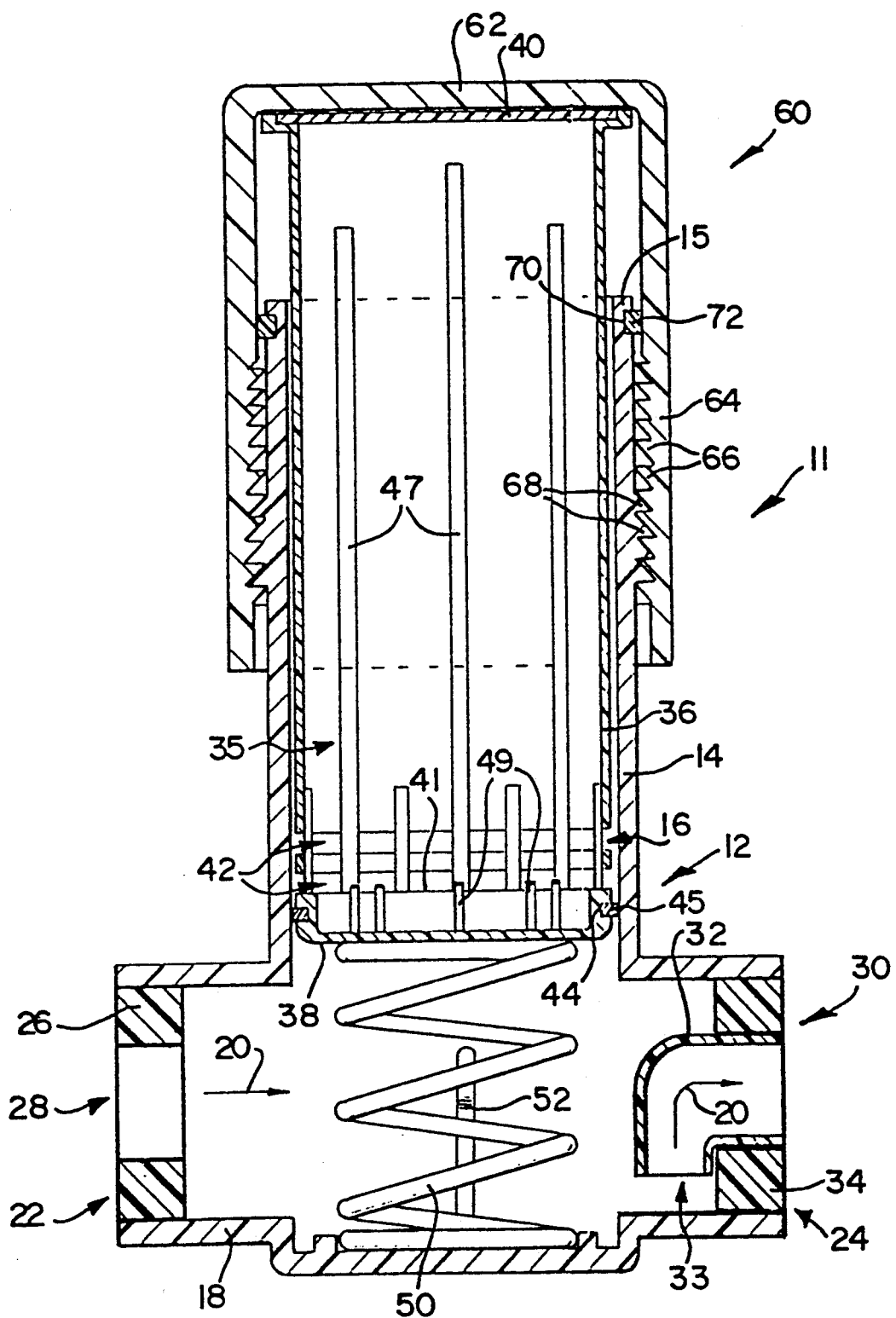
FIG. 2 shows a longitudinal sectional view of the apparatus of FIG. 1, with its cartridge in an inoperative position.
Figure 3:
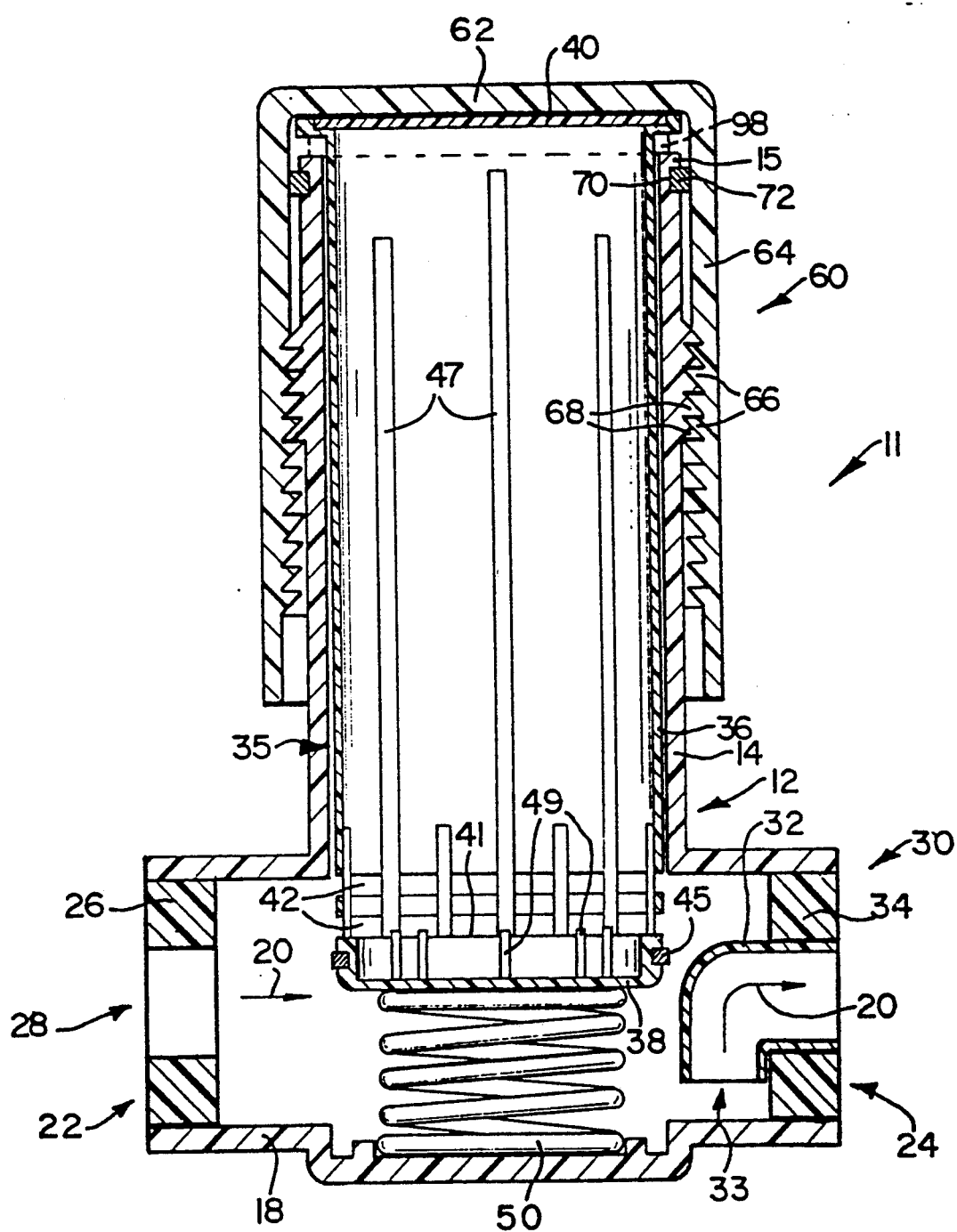
FIG. 3 shows a longitudinal sectional view similar to FIG. 2, with the cartridge in an operative position.

Referring to FIGS. 1 to 3, reference numeral 10 generally indicates a water treatment installation according to one embodiment of the invention.

The installation 10 includes apparatus, generally indicated by reference numeral 11, for controllably treating or dosing water with a water treatment substance, ie an in-line dispensing or dosing apparatus.

The apparatus 11 includes a T-shaped body, generally indicated by reference numeral 12. The body 12 includes a hollow circular cylindrical body portion 14, providing a cylindrical chamber 16. The body portion 14 has, at its free end 15, an opening to the chamber. The body 11 also includes a hollow circular section cylindrical body portion 18 extending orthogonally to the portion 14, and providing a fluid flow path 20 which is in communication with the chamber 16. The portion 18 has a water inlet 22 and a water outlet 24, which are aligned linearly with each other.

At the water inlet 22 is provided an annular reducer 26 so that the water inlet opening 28 provided by the reducer is of smaller cross-sectional area than the remainder of the body portion 18.

At the water outlet 24 is provided a water outlet arrangement 30. The arrangement 30 comprises an elbow 32 mounted in an annular reducer 34, as indicated in FIGS. 2 and 3. The elbow has a downwardly directed inlet 33.

Inside the chamber 16, there is located a container in the form of a cylindrical basket, cartridge or magazine 35. The basket 35 comprises a circular-section cylindrical sleeve 36, and circular imperforate end pieces 38, 40 closing off the respective ends of the sleeve 36. Typically the components of the basket are of plastics material, eg LDPE, polystyrene or the like, and the end piece 40 can be sonically welded to the sleeve 36. The diameter of the end piece 40 is greater than that of the sleeve 36 so that it provides a circumferential flange projecting radially beyond the sleeve 36. Near the end piece 38, the sleeve is provided with a plurality of apertures 42, ie it is foraminous, and water treatment tablets (not shown) are located inside the basket 35, the tablets being located one above the other.

A circumferential groove 44 is provided in the sleeve 35 in proximity to the end piece 38, and in the groove 44 there is located a sealing O-ring 45 of compressible material, eg polyethylene, optionally containing a lubricant, eg containing 25% EVA. The O-ring 45 comprises a rectangular section annular body portion from which protrudes radially outwardly from the groove, a circumferential flange-like portion. A plurality of protrusions 49 protrude into the inside of the sleeve 36 from the end piece 38, and they protrude a sufficient distance, eg about 1 cm, from the end piece 38 so that the lowermost tablet (not shown) resting on them is located slightly above the level of the bottommost edges 41 of the row of apertures 42 closest to the end piece 38. The sleeve is provided with axially extending strengthening ribs 47.

When the basket is then in its inoperative mode as indicated in FIG. 2, the bottommost tablet in the basket will then rest on the protrusions 49 so as to be clear of any liquid in the bottom of the basket. If the bottommost tablet should lie in this liquid, the first volume of liquid dispensed during a subsequent treating mode of operation will have an extraordinary high concentration of the treatment substance in it.

The seal ring 45 also serves to scrape the chamber wall clean as a used or spent cartridge or basket 35 is removed and a fresh one inserted.

A spring 50 is located in the portion 18, and abuts against the underside of the end piece 38. The spring 50 urges the basket 35 out of the flow path 20. A pair of opposed stops 52 are provided on the inside of the body portion 18, and are adapted to engage the undersurface of the end piece 38, thereby to limit the distance which the basket 35 can protrude into the passageway. Instead the spring 50 can be dispensed with, and suitable locating means for locating the cartridge in its operative position, may be provided. For example, the locating means may be a longitudinal formation 98 extending downwardly from the upper end of the sleeve closed off by the end piece 40 and abutting against the upper end 15 of the body portion 14, as indicated in broken line in FIG. 3.

The apparatus 11 also includes a closure member, generally indicated by reference numeral 60. The closure member 60 comprises a circular cover portion 62 and a peripheral skirt 64 depending from the cover portion. The skirt 64 is provided with an internal screw thread formation 66 which engages a complementary external screw thread formation 68 provided around the body portion 14. Between the screw thread formation 68 and the free end 15 of the body portion 14, there is provided a circumferential groove 70 in which is located a circular section sealing O-ring 72 of resiliently compressible polymeric material, eg rubber or TEFLON.

The installation 10 also includes a supply conduit 80 connected to the inlet end of the body portion 18. The supply conduit 80 is fitted with a pressure gauge 82, a pressure regulator 84, a pressure gauge 86, a isolating valve 88 and a drain 90. The pressure regulator 84 may be of a diaphragm or ratio reducing type such as that available in South Africa under the trade name LATCO or MAXIFLO.

A delivery conduit 92 is connected to the discharge end of the elbow 32, and is provided with a drain 94 and a isolating valve 96.

In use, to operate the installation 10, the pressure regulator 84 is first set to reduce the water mains pressure from a value of 0.8-10 bar down to a desired discharge value, eg 0.1-0.6 bar, typically about 0.54 bar. However, it can also be set to higher discharge pressures, if desired. Thereafter, the valves 88, 96 are closed, and the drains 90, 94 opened to drain water from the system. The drains are then again closed, and a cartridge 35 is inserted into the apparatus 10. The closure member 60 is screwed onto the body 11, thereby urging the cartridge to move from an inoperative position as indicated in FIG. 2, to an operative position as indicated in FIG. 3. Simultaneously, air within the system is forced into the cartridge and is pressurized therein. Thereafter the valves 88, 96 are opened. To adjust the level of the water in the apparatus 10, ie to adjust the air pressure, the valves 88, 96 can be closed and one of the drains opened to let sufficient air escape to achieve the desired water level. In this fashion, the dosage level can be adjusted.

The pressurized air within the cartridge as well as pressurized air which accumulates within the upper regions of the flow passage 20, will serve to dampen liquid flow through the lower end of the cartridge which protrudes into the primary liquid flow path. It also assists in controlling the level to which the liquid rises within the cartridge, thus permitting accurate dosage even at low levels, eg levels in the range of 1–10 ppm. Furthermore, due to the use of the elbow 32, the entrained air in the upper regions of the flow passage 20 as well as the compressed air in the cartridge, cannot readily escape so that the accurate dosage levels can be sustained for long periods of time.

The pressure regulator 84 naturally reduces the water pressure and also ensures that the water is supplied at a constant rate. In the event of some water pressure surges still occurring, the compressed air in the cartridge 85 will serve to dampen such surges. If desired, non-return valves (not shown) can be provided in the conduits 80, 92 to assist in retaining pressure within the apparatus 11 when surges in water pressure are experienced.

The discharge conduit 92 can be connected to any desired downstream apparatus, eg a water cistern for use in low pressure water applications such as poultry houses; to an overhead reservoir in which case the apparatus 11 will be located at a high level; or to a pressure vessel, eg a membrane pressure tank, where it can be repressurized.

The applicant believes that with the apparatus 11, and installation 10, problems with chlorinating at low dosage levels which are normally experienced due to fluctuations in the supply water pressure, and which lead to flooding of the cartridge of in-line dosing devices, resulting in inaccurate dosing, are largely overcome.

Figure 4:
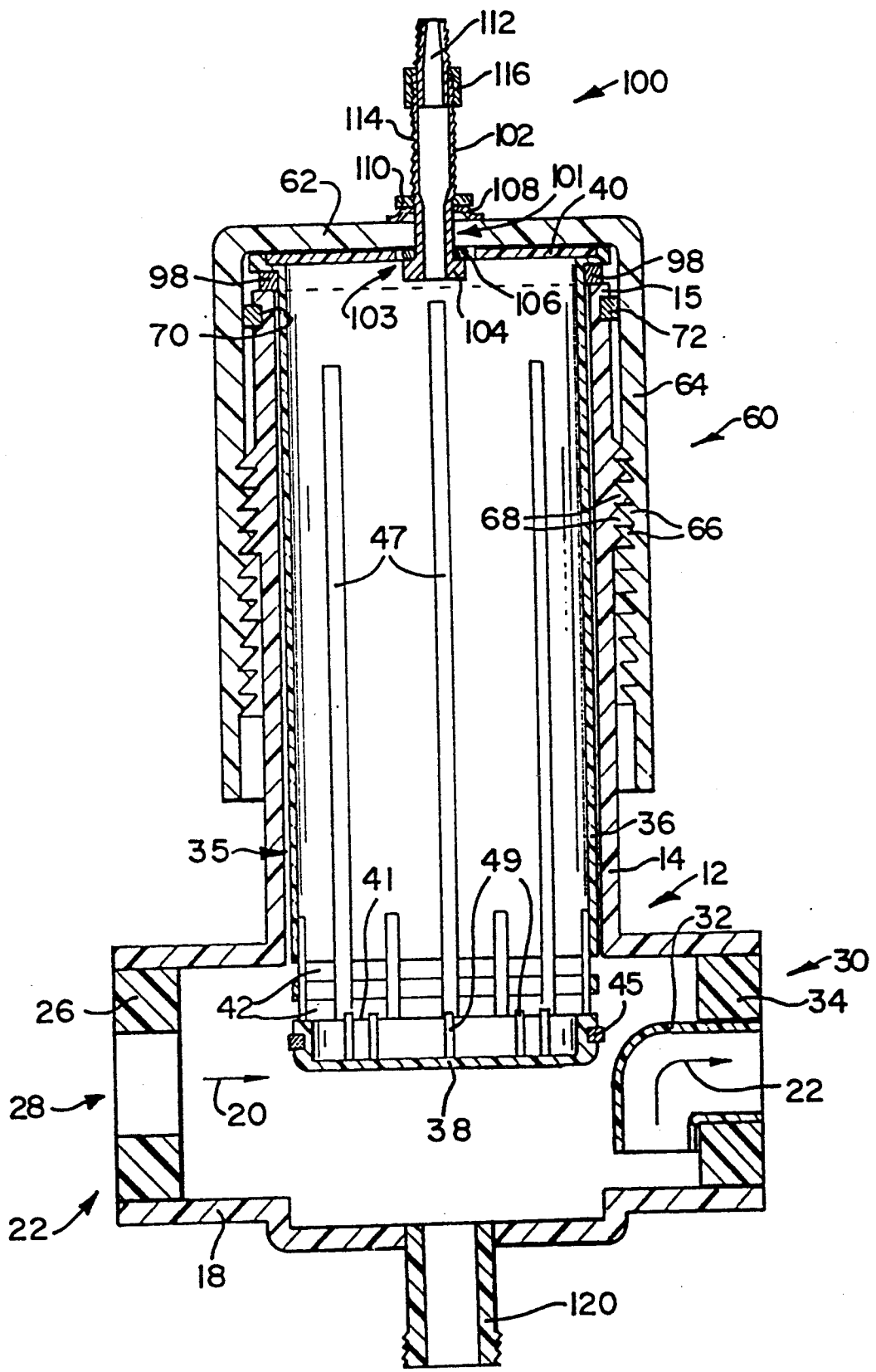
FIG. 4 shows a longitudinal sectional view similar to FIG. 3 of another version of the apparatus of FIG. 1.

In another version of the invention, the apparatus 11 may be provided with pressurizing means 100 as indicated in broken line in FIG. 1, as well as in FIG. 4.

The pressurizing means 100 comprises a central aperture 101 is provided in the cover portion 62, and an externally threaded sleeve-like connector 102 protruding from this aperture. The aperture 101 is aligned with a central aperture 103 in the end piece 40 of the container. The connector 102 has an enlarged shoulder or base portion 104 which abuts sealingly against the underside of the cover portion 62 by means of a rubber O-ring 106. The base portion 104 thus protrudes through the aperture 103 in the end-piece 40. The connector 102 is attached to the cover portion by means of a washer 108 and nut 110. A check or one-way valve 112 is located in the other or free end 114 of the connector, with a nut 116 holding the valve in position. A flexible hose 118 leads from the threaded protruding end of the valve, to a manually operable air pump (not shown).

A threaded, sleeve-like connection 120 leads from the body portion 118, and a drain valve 122 is connected thereto. The drain valve 122 can thus be used instead of, or in addition to, the drain valves 90, 94.

A bypass conduit 124, filled with an isolating valve 106, is also provided. The bypass can be used while a fresh cartridge is being fitted to the apparatus 11.

In use, when a cartridge 35 has been replaced as hereinbefore described, and water flow along the passage 20 recommenced, the inside of the sleeve 36 is pressurized by means of the pump, until the water level in the sleeve is forced down to a desired height or position, typically about one third up the bottommost tablet in the cartridge. The dosage level can be varied by varying the water level in the cartridge eg to increase dosage, the drain valve 122 can be opened intermittently for short periods, to allow some air to escape.

The pressurized air within the cartridge as well as pressurized air which accumulates within the upper regions of the primary flow passage 20, will serve to dampen liquid flow through the lower end of the cartridge which protrudes into the primary liquid flow path, as hereinbefore described, and will assist in controlling the level to which the liquid rises within the cartridge, thus permitting accurate dosage even at low levels, as hereinbefore described. As the tablets are consumed, it will be necessary to adjust the water level in the sleeve back to its original level by periodically activating the pump.

Figure 5:
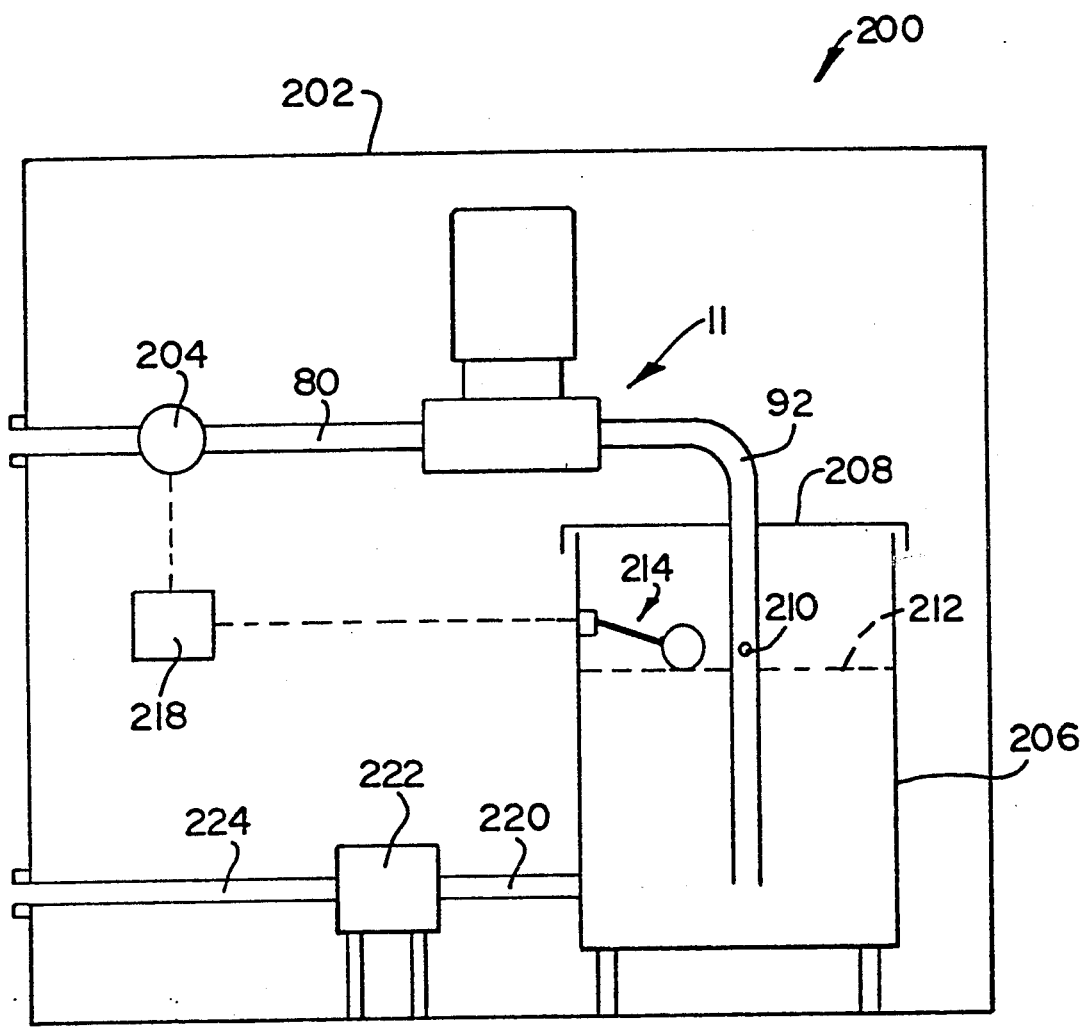
FIG. 5 shows, schematically, a water treatment installation according to another embodiment of the invention.

Referring to FIG. 5, reference numeral 200 generally indicates a water treatment installation according to another embodiment of the invention.

Parts of the installation 200 which are the same or similar to those of the installation 10 hereinbefore described, are indicated with the same reference numerals.

The installation 200 includes a housing 202 in which the apparatus 11 is located. The housing 202 also houses the water supply conduit 80, which leads from the housing. The supply conduit 80 is fitted with a solenoid operated valve 204. The discharge conduit 92 leads into a water receiving vessel 206 below the normal water level 212 in the vessel. The vessel 206 is also located in the housing 200 and has a loosely fitting lid 208 so that the inside of the vessel is at atmospheric pressure. A small bleed opening 210, typically having a diameter of about 3 mm when the conduit 92 has a nominal diameter of 18 mm, is provided in the conduit 92 above the normal or predetermined water level 212 in the vessel. A float operated switch 214 is located inside the vessel 206 and is operatively connected via a control panel 218 to the valve 204. A delivery conduit 220 leads from a water outlet of the vessel 206 to a pressure pump 222 for pressurizing the treated water to a desired pressure. A conduit 224 leads from the pump 222 to the housing. To erect the installation 200, the conduit 80 is merely connected to a water supply while the conduit 224 is connected, at the housing, to a pipeline or conduit (not shown) leading to chicken battery or house drinking troughs.

In use, to operate the installation 200, a cartridge 35 is inserted into the apparatus 11. The closure member 60 is screwed onto the body 12, and as the cartridge is urged further into the body portion 14 by screwing the member 60 further into the body portion 14, it moves from its inoperative position to its operative position as hereinbefore described. As a result of the bleed opening or hole 210 in the conduit 86, the air pressure in the cartridge remains at about atmospheric pressure. When the cartridge is in its operative position, the solenoid valve can be allowed to open and close in response to the float operated switch 214, to maintain the water level at the level 212. Thus, as water is consumed in the chicken house or battery, the water level in the vessel 206 drops and the valve 204 opens to restore the level. The installation functions under widely varying inlet water pressures, eg between 1 and 10 bar, with consistent low dosage levels of 1-10 ppm, even at low water throughputs or low consumption, being achieved.

During passage of water through the apparatus 11, air is entrapped in the basket or cartridge 35 and the chamber 16. This air prevents water from rising in the cartridge so that the water level in the cartridge is such that only lowermost tablet in the cartridge is moistened. Due to the small size of the opening or bleed hole 210, a slight pressure is exerted on the apparatus 11 while water passes through it, as a result of the level of water in the conduit 92 in proximity to its free end, ie the hydrostatic pressure thereof. This assists in trapping the air in the apparatus 11, and allowing water to fill the body portion 18 substantially entirely at low water flow rates.

The on/off switching of the solenoid valve 204 creates turbulence of water within the flow path 20. This causes air to escape from the cartridge through the outlet 24. In this way air is continually lost from the cartridge and chamber, which causes the water to rise in the cartridge and chamber. The dissolution of tablets also leads to the rise of water in the chamber and cartridge.

However, on closing of the valve 204 in response to the liquid level in the vessel, the air pressure in the cartridge is restored to atmospheric pressure by air which is drawn into the system through the opening 210, while water then drains from the cartridge. When the solenoid valve opens again water will again be at the correct level in the cartridge, thereby ensuing constant dosage.

This is of particular importance in systems where water needs to be chlorinated at low levels for on/off systems of water usage. A feature of the invention is thus the prevention of chlorine surges due to back pressure which occurs in on/off water usage systems.

The applicant believes that with the installation 200, problems with chlorinating at low dosage levels which are normally experienced due to fluctuations in the supply water pressure, and which lead to flooding of the cartridge of in-line dosing devices, resulting in inaccurate dosing, are largely overcome.

We claim:

1. A liquid treatment installation, which comprises apparatus for controllably treating a liquid with a liquid treatment substance, the apparatus comprising a body having a first portion providing an elongate container receiving zone and an opening leading into the zone, a well as a second portion providing a liquid flow path, with the container receiving zone being in communication with the liquid flow path, the second portion having a liquid inlet as well as a liquid outlet, and with the liquid inlet and the liquid outlet being spaced apart on opposite sides of the container receiving zone;

a container for a liquid treatment substance, the container comprising a cylindrical sleeve, end pieces closing off each end of the cylindrical sleeve, and at least one aperture in the sleeve in proximity to a first end thereof, with the container located in the container receiving zone of the body so that its first end protrudes sufficiently into the liquid flow path for the aperture in the sleeve to be exposed to liquid flowing along the liquid flow so that, in use, liquid enters the container through the aperture and a liquid level is established in the container;

a removable closure member closing off the opening in the first body portion and against which the other or second end of the container abuts;

a liquid supply conduit connected to the liquid inlet of the apparatus;

control means in the supply conduit for controlling the supply of liquid along the conduit;

a liquid discharge conduit connected to the liquid outlet of the apparatus and being open to atmosphere so that, on interruption of liquid flow through the apparatus by means of the control means, air can enter the apparatus, and hence the container, through the discharge conduit, so as to restore the air pressure within the container and thus ensure that the liquid rises to the same level in the container each time liquid flow is recommended, thereby to dose the liquid passing along the flow path accurately with liquid treatment substance;

a receiving vessel into which the discharge conduit discharges; and liquid level measuring means in the vessel, the level measuring means being operatively connected to the control means such that, on the liquid level in the vessel dropping below a predetermined setting, the control means is actuated by means of the level measurement means, to allow liquid flow through the apparatus into the vessel, and on the liquid level in the vessel rising to the predetermined setting or to another predetermined setting, the control means is de-actuated to interrupt or stop the liquid flow through the apparatus.

2. An installation according to claim 1, wherein the liquid outlet in the second body portion is of reduced cross-sectional area as compared to me second body portion, with the inlet and outlet being arranged such that the liquid flow path through the second body portion is non-linear.

3. An installation according to claim 1, wherein the inlet and outlet are aligned with each other, and wherein a conduit is provided within the second body portion, the conduit having an inlet opening directed away from the container receiving zone and its outlet opening constituting the liquid outlet, and with the conduit being of reduced cross-sectional area as compared to the second body portion.

4. An installation according to claim 1, which includes valve means in the supply and discharge conduits; and pressure regulating means in the supply conduit; and wherein the apparatus includes seal means around the container with the seal means forming a fluidtight yet movable seal between the container and the first body portion so that on insertion of the container in the first body portion and urging thereof to the position in which the first end protrudes into the liquid flow path, air in the first body portion and container will thereby be compressed when the valve means are closed.

5. An installation according to claim 1, which includes pressurizing means for pressurizing the container with a gaseous pressurizing medium, thereby to assist in controlling or maintaining the liquid level in the container.

6. An installation according to claim 5, wherein the pressurizing means comprises a connector in the end piece at the second end of the sleeve, with the connector extending through an aperture in the closure member and being adapted so that a pressurizing medium conduit can be connected thereto; and a one-way valve in the connector.

7. Apparatus for controllably treating a liquid with a liquid treatment apparatus, the apparatus comprising a body having a first portion providing an elongate container receiving zone and an opening leading into the zone, as well as a second portion providing a liquid flow path extending transversely to the container receiving zone, with the container receiving zone being in communication with the liquid flow path, the second portion having a liquid inlet as well as a liquid outlet, and with the liquid inlet and the liquid outlet being spaced apart on opposite sides of the container receiving zone;

a container for a liquid treatment substance, the container comprising a cylindrical sleeve, end pieces closing off each end of the cylindrical sleeve, and at least one aperture in the sleeve in proximity to a first end thereof, with the container located in the container receiving zone of the body so that its first end protrudes sufficiently into the liquid flow path for the aperture in the sleeve to be exposed to liquid flowing along the liquid flow so that, in use, liquid enters the container through the aperture and a liquid level is established in the container; and a removable closure member closing off the opening in the first body portion and against which the other or second end of the container abuts; with the liquid outlet being of reduced cross-sectional area as compared to the second body portion, and with the inlet and outlet being arranged such that the liquid flow path through the second body portion is non-linear.

8. Apparatus according to claim 7, wherein the inlet and outlet are aligned with each other, and which includes a conduit within the second body portion, the conduit having an inlet opening directed away from the container receiving zone and its outlet opening constituting the liquid outlet, and with the conduit being of reduced cross-sectional area as compared to the second body portion.

9. Apparatus according to claim 7, which includes seal means around the container with the seal means forming a fluidtight yet movable seal between the container and the first body portion.

10. Apparatus according to claim 7, which includes pressurizing means for pressurizing the container with a gaseous pressurizing medium, thereby to control or maintain the liquid level in the container.

11. Apparatus according to claim 10, wherein the pressurizing means comprises a connector in the end piece at the second end of the sleeve, with the connector extending through an aperture in the closure member and being adapted so that a pressurizing medium conduit can be connected thereto; and a one-way valve in the connector.

12. Apparatus for controllably treating a liquid with a liquid treatment apparatus, the apparatus comprising a body having a first portion providing an elongate container receiving zone and an opening leading into the zone, as well as a second portion providing a liquid flow path extending transversely to the container receiving zone, with the container receiving zone being in communication with the liquid flow path, the second portion having a liquid inlet as well as a liquid outlet, and with the liquid inlet and the liquid outlet being spaced apart on opposite sides of the container receiving zone;

a container for a liquid treatment substance, the container comprising a cylindrical sleeve, end pieces closing off each end of the cylindrical sleeve, and at least one aperture in the sleeve in proximity to a first end thereof, with the container located in the container receiving zone of the body so that its first end protrudes sufficiently into the liquid flow path for the aperture in the sleeve to be exposed to liquid flowing along the liquid flow so that, in use, liquid enters the container through the aperture and a liquid level is established in the container;

a removable closure member closing off the opening in the first body portion and against which the other or second end of the container abuts; and pressurizing means for pressurizing the container with a gaseous pressurizing medium, thereby to control the liquid level in the container.

13. Apparatus according to claim 12, wherein the pressurizing means comprises a connector in the end piece at the second end of the sleeve, with the connector extending through an aperture in the closure member and being adapted so that a pressurizing medium conduit can be connected thereto; and a one-way valve in the connector.

* * * * *